July 11, 1967 J. T. SIBILIA 3,330,986

METHOD OF CONSTRUCTING A SLOW-WAVE COMB STRUCTURE

Filed Aug. 12, 1964 2 Sheets-Sheet 1

INVENTOR
J. T. SIBILIA
BY
Lyman Sherman
ATTORNEY

July 11, 1967 J. T. SIBILIA 3,330,986

METHOD OF CONSTRUCTING A SLOW-WAVE COMB STRUCTURE

Filed Aug. 12, 1964 2 Sheets-Sheet 2

United States Patent Office 3,330,986
Patented July 11, 1967

3,330,986

METHOD OF CONSTRUCTING A SLOW-WAVE COMB STRUCTURE

John T. Sibilia, New Providence, N.J., assignor to Bell Telephone Laboratories, Incorporated, New York, N.Y., a corporation of New York Filed Aug. 12, 1964, Ser. No. 389,169
5 Claims. (Cl. 313—352)

This invention relates to a method of making a comb-type slow-wave structure for use in electromagnetic wave devices. The invention has special application to such structures intended for use at microwave frequencies and at temperatures appreciably different from room temperature.

In United States Patent 3,004,225, issued to R. W. De Grasse and E. O. Schulz-Du Bois on Oct. 10, 1961, and in United States Patent 3,076,148, issued to E. O. Schulz-Du Bois and W. J. Tabor on Jan. 29, 1963, there is described a traveling wave maser comprising a slow-wave, comb-like structure suitably loaded with an active material to produce stimulated emission of radiation at the microwave signal frequency and at liquid helium temperatures.

Devices of the type described in the above-mentioned patents have been successfully operated at C-band and L-band. However, experience has revealed a number of practical mechanical and electrical factors which adversely affect their operation. For example, the prior art slow-wave comb structure used in traveling wave masers consists of copper fingers unsupported at one end. While high initial uniformity of finger spacing is obtained through the use of precision hobbing, subsequent operations, such as machining to final dimensions, handling, and thermal cycling between room and liquid helium temperatures during operation, degrade this initial uniformity and, along with it, the gain and phase characteristics of the maser. This degradation is serious in such demanding applications as monopulse radar or broadband communications. The need, therefore, exists for a maser slow-wave structure of improved uniformity and stability.

The problems associated with prior art comb structures are serious even in less demanding applications. For example, differential thermal contraction between the active material, such as ruby, and the copper comb structure is such that lengths of ruby and copper equal at room temperature differ substantially when cooled for operation at liquid helium temperature. More specifically, the copper becomes smaller than the ruby material. In a maser, where two ruby slabs are spring loaded against the comb fingers, the effect of this unequal contraction is to distort the comb fingers. The details of this distortion depend upon the essentially accidental distribution of friction over the contact area between the individual fingers and the ruby slab and, hence, can neither be predicted nor readily controlled. The result, however, is to produce insertion losses and irregularities in the frequency response.

In the maser described in the copending application by Chen, Hensel, Hiatt and E. O. Schulz-Du Bois, Ser. No. 223,585, now Patent No. 3,214,701, filed Sept. 12, 1962, ceramic spacers are placed between the open-circuited ends of the comb fingers, and bonded to the maser material. While this maintains uniform finger-to-finger spacing, there is an over-all fan-like distortion of the comb structure at low temperatures due to the above-mentioned difference in the coefficient of thermal expansion between the ruby slab and the copper comb structure. While this bending of the fingers at low temperatures is tolerable at L-band, at the higher frequencies, such as C-band, the fingers are sufficiently small so as to suffer excessive and at times, permanent distortion.

In addition, the above-described method of fabricating comb structures, including spacers, is extremely time consuming and expensive, and results in a structure whose dimensional accuracy is degraded during manufacture.

It is, accordingly, an object of this invention to simplify the method of making comb structures.

It is a further object of this invention to make comb structures of improved electrical and physical stability.

In accordance with the invention, low-loss dielectric spacers, having a coefficient of thermal expansion that is compatible with that of the comb structure, are placed between and bonded to, the comb fingers, thereby converting the series of fingers into a solid fin. This is done in the course of a process which includes the steps of hobbing a blank metallic piece, annealing the piece to relieve the stresses set up during hobbing, inserting and bonding the dielectric spacers in the indentations produced by the hobbing step, and grinding the piece to the required dimensions.

By the term "compatible" coefficient of expansion, as used herein, it is meant that the integrated differential contraction between the spacers and the metal of the comb structure is small enough so that the stresses set up within the materials do not exceed the elastic limits for the materials. Thus, in selecting materials, integrated differential contraction calculations are made along the finger length, along the finger width and along the comb length. These calculated differential contractions are converted to strains and, finally, to stresses by Hooke's law. The stresses are then compared with the published strengths of the materials to give an indication of the soundness of the structure over the temperature range of interest.

The hobbing step produces indentations in the metal piece which constitute the spaces between the comb fingers. It is an advantage of the present invention that by bonding the comb fingers together prior to the grinding process, the high order of dimensional accuracy inherent in the hobbing step is retained. In addition, by bonding the spacers to the fingers instead of to the maser material, as in the prior art, the differential expansion between the maser material and the comb does not cause fanning of the comb fingers.

Slow-wave structures produced by this technique show a fivefold improvement in the precision of finger spacing over previous methods. In addition, the fingers are locked in position and, hence, are less subject to damage. A stress analysis of the structure shows that stresses created during thermal cycles are well below the failure stresses of the materials.

The presence of dielectric material between the fingers adds to the dielectric loading provided by the ruby. As a result, gains of 15 decibels per inch have been achieved with a new maser design as compared with only 10 decibels per inch obtained previously. The increase is due to a higher degree of slowing which results from the more favorable dielectric loading of the slow-wave structure.

These and other objects and advantages, the nature of the present invention, and its various features, will appear more fully upon consideration of the various illustrative embodiments now to be described in detail in connection with the accompanying drawings, in which.

Figure 1:
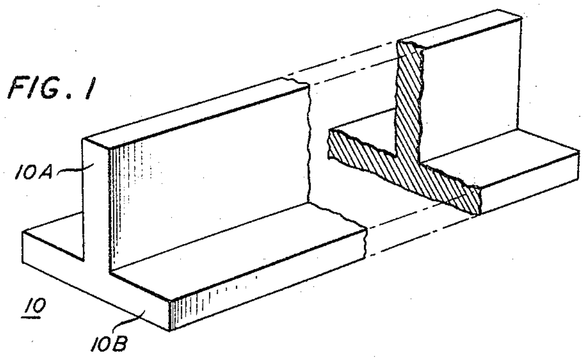
FIG. 1 shows a metal blank from which the comb structure is made.

Referring to the drawings, FIGS. 1–5 illustrate the steps in the process of making a comb structure in accordance with the present invention. The process operates upon a metal blank 10 of the type illustrated in FIG. 1. As shown, the blank has a T-shaped cross section with a stem portion 10A and a cross-arm portion 10B which will serve as the base for supporting the comb in the finished structure. Typically, the metal used is copper, although other materials can be used. However, as will be pointed out later, the metal used and the finger spacers must have compatible coefficients of thermal expansion.

Figure 2:
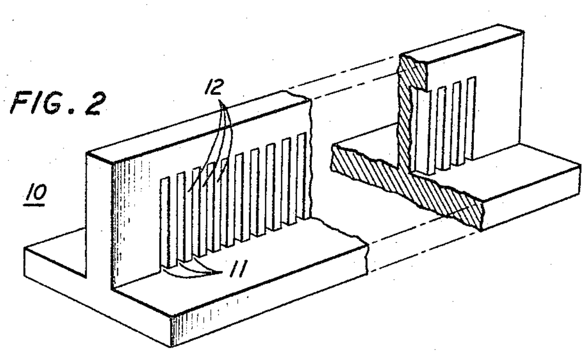
FIG. 2 shows the lands and grooves produced by the hobbing step.

The initial step is the hobbing step which produces a series of grooves, or indentations, 11 and lands 12 in the stem portion of the member 10 as seen in FIG. 2. As illustrated, the hobbing process forms a parallel array of linear indentations. Hobbing is done with a precision tool to an accuracy of the order of ±.0001 inch. For a particular comb structure constructed to operate at C-band, the grooves and lands were each about one inch long, 0.100 inch deep and 0.0400 inch in width. The most significant dimension is the 0.0400, which in the embodiment being described represents both the finger width and finger spacing of the finished comb.

It is to be understood, however, that the widths of the grooves and lands need not be the same.

The hobbed piece was annealed after the hobbing step, in accordance with normal hobbing practices, to relieve stresses set up during the hobbing operation. The piece was also cleaned by dipping in hot HCl, which attacks copper oxide, but not copper.

At this point in the process, the widths of the lands and the indentations are precise along the entire structure to a tolerance of approximately ±.0002 inch.

Figure 3:
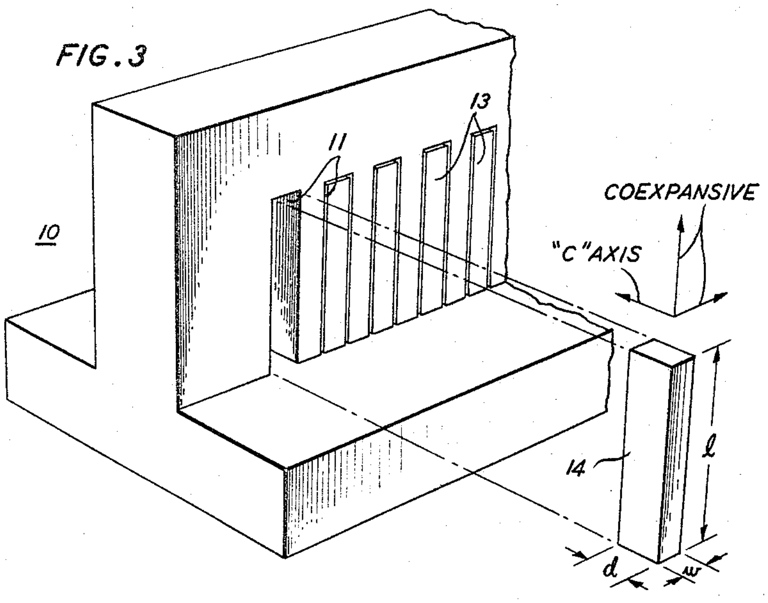
FIG. 3 shows a portion of the hobbed blanks with dielectric inserts placed within the grooves.

After annealing and cleaning, dielectric inserts were placed into the indentations in the metal and bonded to the lands. This is illustrated in FIG. 3 which shows a section of the hobbed blank 10 and two inserts 13 placed within indentations 11. The inserts are made of a material whose coefficient of thermal expansion is compatible with that of the metal.

As indicated above, a low-loss dielectric material is selected which has a coefficient of thermal expansion that is compatible with that of the metal. Compatibility, however, also depends upon the dimensions of the structure since, for any particular combination of materials, the dimensions determine the stresses set up in the materials over the operating temperature range. In general, the smaller the dimension, the greater the difference in the coefficients of thermal expansion may be. Thus, in the comb structure being considered herein, the coefficient of thermal expansion of the dielectric material in the direction of the finger depth $d$ (which is the smallest dimension of the comb) can differ from that of the metal to a much greater degree than it can in the direction along the fingers or along the direction of the comb itself.

As copper is typically used as the metal in comb structures, a material with an average coefficient of expansion compatible with that of copper from room temperature to liquid helium temperature is used. One such material is crystalline quartz.

The room temperature, expansivity of crystalline quartz is $13.5\times10^{-6}$ per degree K. in a plane perpendicular to the crystalline C axis, and $7.5\times10^{-6}$ per degree K. in the direction of the C axis. The expansivity of copper is $16.5\times10^{-6}$ per degree K. at room temperature. The axes of the quartz having expansivities which more closely match that of the copper are directed along the finger length, and along the finger-to-finger direction (along the comb), which are the two larger directions. The largest mismatch of expansivity between the copper and the quartz occurs along the depth $d$ of the fingers, which is a small dimension.

Since the expansivities are a function of temperature, and typically a comb undergoes large temperature excursions, the stresses set up in the structure must be examined over the entire temperature range. This was done and they were found to fall well within tolerable limits.

The quartz was cut into rectangular parallelopipeds, of dimensions slightly less than the dimensions of the indentations 11. For the example given above, the inserts were cut to the following dimensions: width $$w=0.039\pm.001$$

inch, depth $d=0.100\pm.005$ inch, and length $$l=0.850\pm.005 \text{ inch}$$

One such insert 14, prior to its insertion into one of the indentations, is also shown in FIG. 3 with the crystalline C axis and the various dimensions indicated. As shown in FIG. 3, the quartz inserts are cut and aligned so that the C axis is aligned parallel to the depth of the fingers.

The spacer inserts were precision lapped to a close tolerance along the finger-to-finger direction. Uniformity in size was obtained by simultaneously lapping a complete set of spacers.

The inserts are bonded in position between fingers by means of a bonding agent that is sufficiently rigid to retain the inserts in position during subsequent machining operations, and yet is sufficiently resilient to avoid the generation of extreme stresses during temperature cycling. One such bonding agent used successfully is the commercially available epoxy resin Armstrong C–4 (diglycidyl ether bisphenol-a, manufactured by Armstrong Products Company, Incorporated of Warsaw, Ind.) used with Activator W. The epoxy is cured at 150° F. for about two hours. However, the curing time and temperature are not critical and would depend upon the particular epoxy used.

Figure 4:
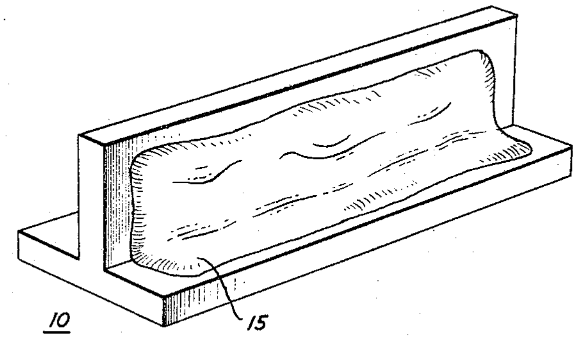
FIG. 4 shows the comb structure with the dielectric inserts bonded in place.

FIG. 4 shows the hobbed blank after the bonding material has been cured and the piece is ready for further processing. The latter includes machining (typically, by grinding) the piece to its final dimension. In this regard the presence of the quartz between the fingers has a practical advantage at this stage in that it acts as an edge against which the metallic fingers are cut during grinding. This results in fewer burred surfaces and, subsequently, to a more efficient electrical structure.

Figure 5:
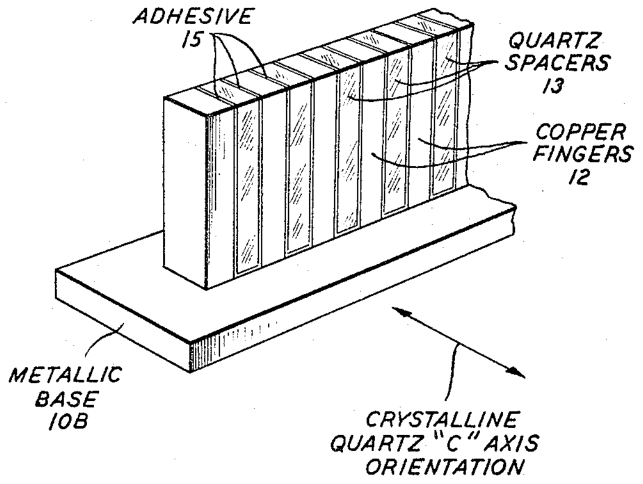
FIG. 5 shows a section of the finished comb structure following the machining step.

FIG. 5 shows a portion of the final comb structure with the various elements identified, including the fingers 12, the spacers 13, the adhesive 15 and the metallic base 10B. As is readily seen, the structure is a solid unitary member whose structural and electrical uniformity is assured throughout the life of the piece.

While the comb structure has been described in connection with the traveling wave maser, it is understood that the process described hereinabove and the resulting structure can be used in other applications requiring slow-wave comb structures, such as, for example, are shown in United States Patents 2,708,236 and 2,942,142. In devices of the type disclosed in these patents, the temperature of the comb structure typically rises above room temperature during operation. Thus, while stresses are set up in the structure, the stress must be examined over a different temperature range than was considered hereinabove. Thus, in all cases it is understood that the above-described arrangement is illustrative of one of the many possible specific embodiments which can represent applications of principles of the invention. Numerous and varied other arrangements can readily be devised in accordance with these principles by those skilled in the art without departing from the spirit and scope of the invention.

What is claimed is:

1. The method of making a comb structure comprising the steps of;

creating a series of indentations in a metallic blank;
inserting within said indentations dielectric spacers whose coefficient of thermal expansion is compatible with that of said metal;
bonding said spacers in place within said indentations;
and machining said blank with the inserted spacers to the desired dimensions.

2. The method of making a comb structure comprising the steps of;

creating a linear array of indentations in a copper blank;
annealing the blank to relieve stresses within the copper;
inserting crystalline quartz spacers into the depression with the crystalline C axis of said quartz directed parallel to the direction of said indentations;
bonding said spacers in place;
and machining to size.

3. The method according to claim 1 wherein;

said metallic blank is a copper member having a T-shaped cross section;
said series of indentations comprises a parallel array of linear indentations created by hobbing the stem portion of said copper member;
said dielectric spacers are crystalline quartz inserted in said indentations with the crystalline C axis extending in the direction of said indentations;
and wherein said machining forms a copper comb with successive teeth spaced apart from one another by the quartz inserts.

4. A comb structure for use in an electromagnetic wave device comprising:

a metallic comb structure having a base and a coplanar array of parallel fingers of rectangular cross section;
said fingers being spaced from each other and having one end thereof short circuited to said base;
and means for maintaining a uniform spacing between adjacent fingers comprising solid dielectric spacers disposed between and bonded to adjacent fingers to form a solid unitary member;
said spacers having a coefficient of thermal expansion compatible with that of said metallic comb structure.

5. The structure according to claim 4 wherein said metallic comb structure is copper and said spacers are crystalline quartz.

References Cited

UNITED STATES PATENTS

| | | | |
|---|---|---|---|
| 2,567,748 | 9/1951 | White | 333—31 |
| 2,636,148 | 4/1953 | Gorham | 315—3.5 |
| 2,706,366 | 4/1955 | Best | 315—3.6 |
| 2,760,111 | 8/1956 | Kumpfer | 315—39.73 X |
| 2,813,221 | 11/1957 | Peter | 315—3.5 |
| 2,888,597 | 5/1959 | Dohler et al. | 315—3.5 |
| 2,908,844 | 10/1959 | Quate | 315—3.6 |
| 2,992,348 | 7/1961 | Okstein | 333—31 |
| 3,069,594 | 12/1962 | Feinstein | 315—29 |
| 3,214,701 | 10/1965 | Fang-Shang-Chen | 330—4 |

JOHN W. HUCKERT, *Primary Examiner.*

A. J. JAMES, *Assistant Examiner.*